Figure 11:
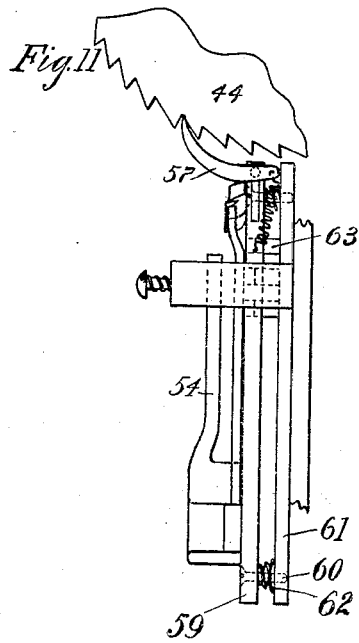

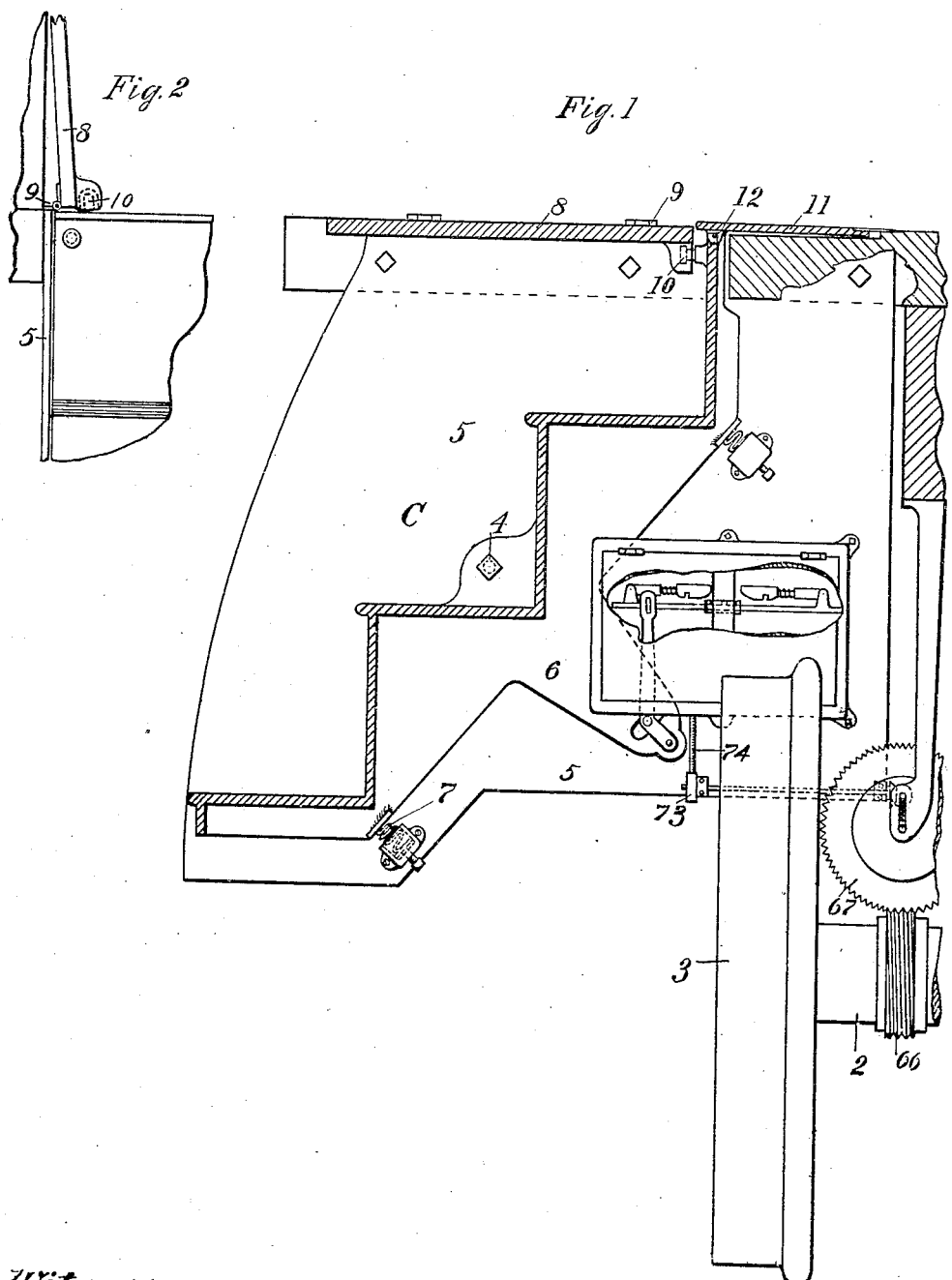

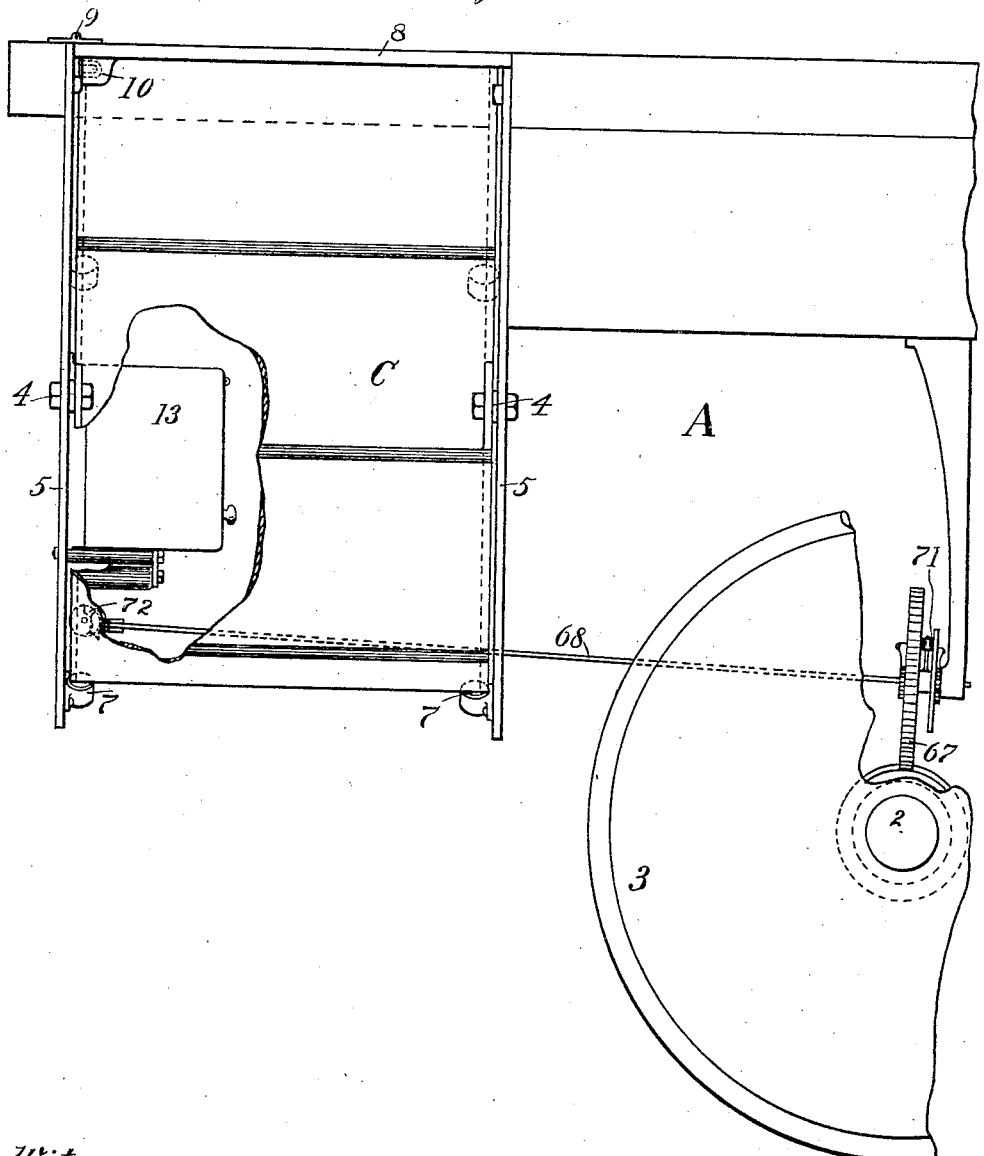

No. 877,542.
PATENTED JAN. 28, 1908.
N. J. BARND.
REGISTERING APPARATUS.
APPLICATION FILED NOV. 17, 1906.
6 SHEETS—SHEET 3.
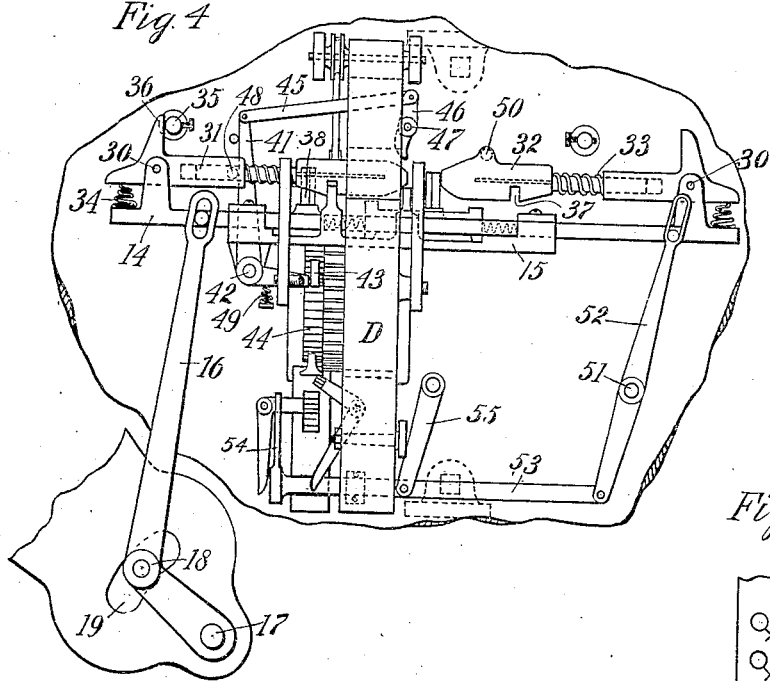
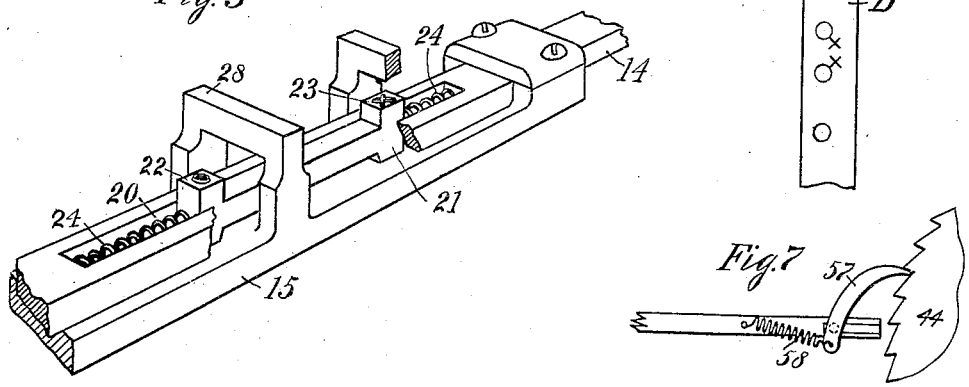
Witnesses,
George Voelker
Hattie Smith
Inventor,
Nicholas J. Barnd
by Lothrop & Johnson
his Attorneys.

No. 877,542.
PATENTED JAN. 28, 1908.
N. J. BARND.
REGISTERING APPARATUS.
APPLICATION FILED NOV. 17, 1906.
6 SHEETS—SHEET 4.
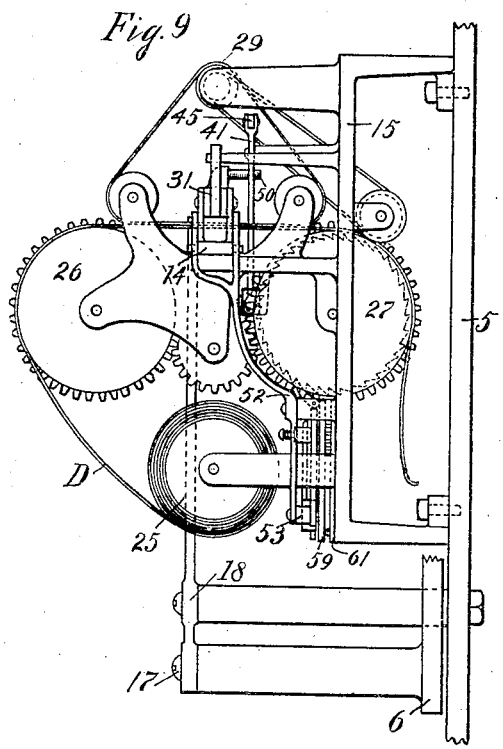
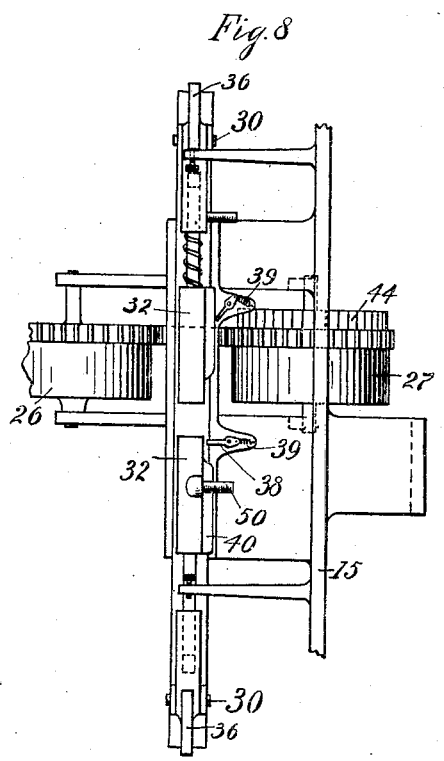
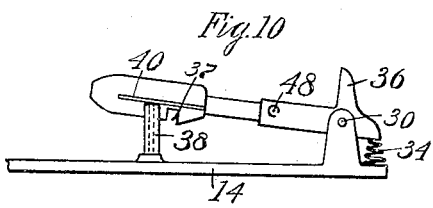
Witnesses,
George Voelker
Hattie Smith
Inventor,
Nicholas J. Barnd
by Lothrop & Johnson
his Attorneys.

No. 877,542. PATENTED JAN. 28, 1908.
N. J. BARND.
REGISTERING APPARATUS.
APPLICATION FILED NOV. 17, 1906.

6 SHEETS—SHEET 5.

Witnesses,
George Voelker
Hattie Smith.

Inventor;
Nicholas J. Barnd
by Lothrop Johnson
his Attorneys.

No. 877,542.

PATENTED JAN. 28, 1908.

N. J. BARND.
REGISTERING APPARATUS.
APPLICATION FILED NOV. 17, 1906.

6 SHEETS—SHEET 6.

Witnesses,
George Voelker
Hattie Smith

Inventor,
Nicholas J. Barnd.
by Lothrop & Johnson
his Attorneys.

UNITED STATES PATENT OFFICE.

NICHOLAS J. BARND, OF CHOKIO, MINNESOTA.

REGISTERING APPARATUS.

No. 877,542.            Specification of Letters Patent.            Patented Jan. 28, 1908.

Application filed November 17, 1906. Serial No. 343,825.

*To all whom it may concern:*

Be it known that I, NICHOLAS J. BARND, a citizen of the United States, residing at Chokio, in the county of Stevens and State of Minnesota, have invented certain new and useful Improvements in Registering apparatus, of which the following is a specification.

My invention relates to improvements in registering apparatus, its object being particularly to provide improved means in connection with the steps of railway cars for recording the number of passengers entering and departing from the car, as well as the travel of the car.

To this end my invention consists in the features of construction and combination hereinafter particularly described and claimed.

In the accompanying drawings forming part of this specification, Figure 1 is a vertical section through the steps of a car, embodying my invention; Fig. 2 is a detail view of a trap door over the car steps shown in Fig. 1; Fig. 3 is a front elevation of the steps partly broken away; Fig. 4 is a front view of recording mechanism forming part of my invention; Fig. 5 is a perspective view of part of the recording mechanism; Fig. 6 is a detail view of an indicating tape; Fig. 7 is a detail view of part of the recording mechanism; Fig. 8 is a top view of the recording mechanism; Fig. 9 is a side view of the same; Fig. 10 is a detail of part of the printing mechanism involved in my invention; Figs. 11 to 17, inclusive, are detail views of mechanism for actuating the registering tape between operations of the printing apparatus; and Figs. 18 to 21, inclusive, are detail views of mechanism for moving the recording tape a predetermined amount for a certain travel of the car.

In the drawings A represents the car body, 2 represents one of the axles, and 3 one of the drive wheels.

C represents a flight of car steps. As shown in Fig. 1, these steps are integrally formed and have central pivotal support 4 in the side plates 5, the side plates 5 being suitably supported upon the car body. Extending rearwardly from the flight of steps are side flanges 6. Arranged in connection with the upper and lower ends of the flanges 6 are spring buffers or cushions 7, suitably supported upon the side plates 5. These buffers hold the steps normally in the position shown in Fig. 1 but allow swinging of the steps upon their pivots, as hereinafter more particularly described. Arranged above the flight of steps is an ordinary trap door 8, having hinge support 9 and detachable interlocking connection 10 with the upper rise of the steps. A tread plate 11 is arranged in the floor of the car and has hinged connection 12 with the upper step rise.

In Figs. 4, 8 and 9 is shown in detail my improved recording apparatus. This apparatus, as shown in Figs. 1 and 3, is incased in a cabinet 13 supported underneath the flight of steps. Forming part of the recording mechanism is a slide bar 14 supported in a frame 15. The slide bar at one end has pin and slot connection with the upper end of a bell-crank lever 16, the end of the lower arm of said lever having pivotal connection 17 with the rear end of the adjacent flange 6. The lever 16 has fulcrum support 18 in the adjacent plate 5, the fulcrum extending through a slot 19 in the flange 6. As the steps are oscillated upon their pivotal supports the slide 14 will be reciprocated through the medium of the connecting bell-crank 16. Arranged within the slotted opening 20 in the slide 14 and supported upon the base 15 is a printing frame 21 carrying at its ends types 22 and 23. Springs 24 are interposed between the ends of the printing frame 21 and the opposite walls of the slide. D represents a suitable recording tape, such as a paper strip, which runs from a roller 25 over conveying rolls 26 and 27. Intermediately of the rolls 26 and 27 the tape runs over the printing frame 21 between the cross bars 28. An inking ribbon 29 runs over suitable rollers above the rollers 26 and 27, as shown in Fig. 9, and is driven by the contact of one of its rollers with the roller 27. The tape is caused to travel as hereinafter particularly pointed out. Having pivotal support 30 upon each end of the slide 14 is a bar 31, slidably supporting in its inner end a hammer 32, a coil spring 33 being interposed between the hammer and bar. The hammer is held lowered by means of a spring 34 interposed between the outer end of the bar and the slide, and the bar is turned upon its pivot 30 to raise the hammer by means of a stop 35 arranged in position to strike the upper projection 36 of the bar. Each hammer 32 is formed in its under side with a notch 37 to receive the corresponding cross bar 28. When the steps below the pivot 4 are stepped upon, the resulting swing of the bell-crank 16 will actuate the slide bar as shown in Fig. 4. This carries the left hand hammer inward sufficiently to cause it to drop into the position shown in Fig. 4 in which position it interlocks with the adjacent cross bar and strikes against the type 22 to cause the same to make an impression upon the tape, the force of the blow being caused by the spring 34. As the movement of the slide bar 14 continues it will travel alongside the printing frame by reason of the slidable support of the printing frame within the slide 14 and of the hammer within the bar 31. As soon, however, as the slide has moved far enough to make contact with the stop 35, the bar 31 will be turned by said stop upon its pivot, raising the hammer out of engagement with the cross bar. In order to prevent the hammer dropping back while it is being withdrawn, I provide the trips 38 shown in Fig. 8, said trips being provided with springs 39 which normally hold them in the position shown. When the hammer is carried inward with the slide, the flange 40 upon the side of the hammer will strike with trip 38, turning it out of its path, as shown in the upper half of Fig. 8, but when the hammer has been raised as just described, and is being withdrawn, it will slide over the top of the trip as shown in Fig. 10, the spring 39 being sufficiently strong to hold the trip in upright position. In order to move the tape with each movement of the slide bar, I provide the bell-crank lever 41 having fulcrum support 42 and carrying upon the inner end of its lower arm a pawl 43 engaging with the ratchet wheel 44 carried by the roll 27. The upper end of the bell-crank is connected by a lever arm 45, with a second bell-crank 46 having fulcrum support 47 upon the other side of the tape. The left hand hammer bar 31 carries a pin 48 which strikes the bell-crank 41 in the inner movement of the bar to release the pawl 43, so that as soon as the bell-crank is released, the spring 49 will move the bell-crank to actuate the pawl to turn the ratchet wheel and move the tape. When the slide 14 moves in the opposite direction, a pin 50 carried by the right hand hammer will strike the lower end of the bell-crank 46 to cause the ratchet to be actuated in the same manner as when the pin 48 strikes the bell-crank 41. Thus with the movement of the slide 14 in either direction the tape is moved a predetermined amount. The object of the mechanism just described is to move the tape slightly between the printing operations of the types 22 and 23.

Figure 12:
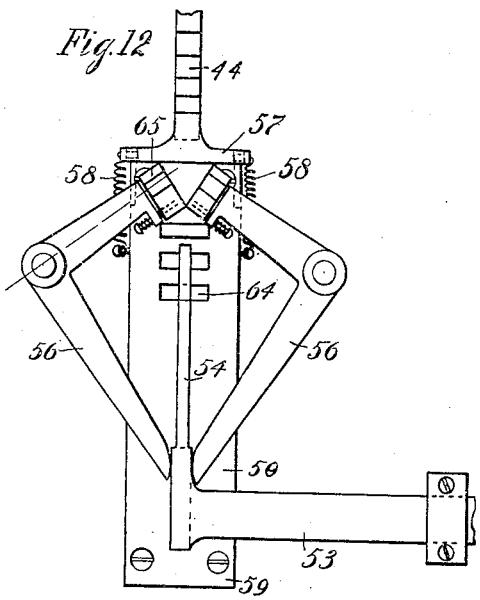
Figure 13:
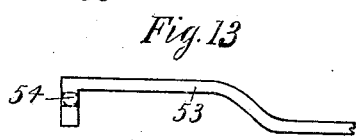
Figure 14:
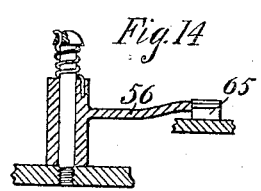
Figure 15:
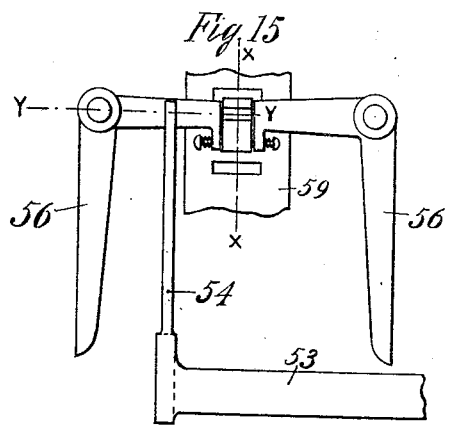
Figure 16:
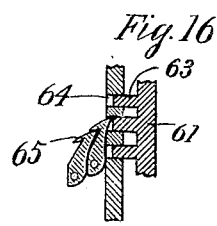
Figure 17:
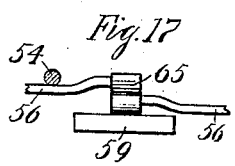
Figure 18:
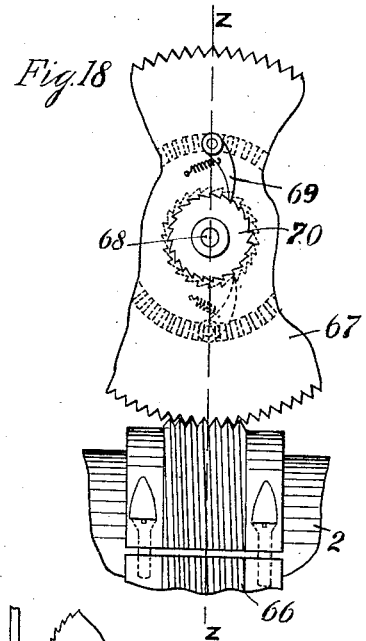
Figure 19:
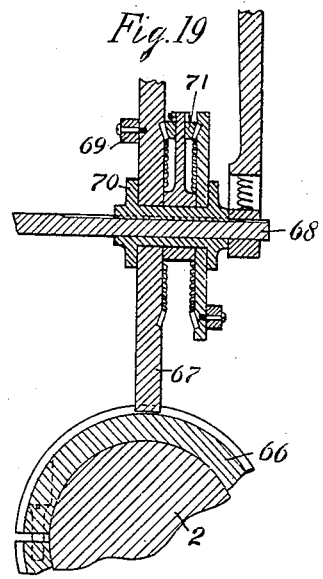
Figure 20:
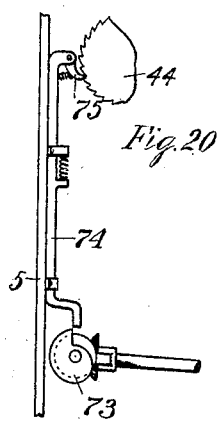
Figure 21:
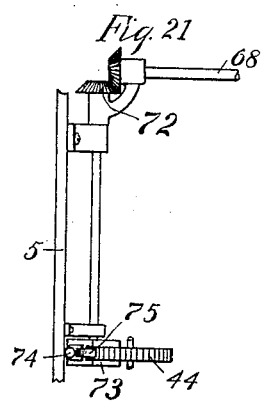

In order to give the tape a greater amount of travel after each passenger has entered or departed from the car, I provide the following mechanism: Having fulcrum support 51 below one end of the slide 14, is a straight lever 52, the upper end of the lever having slot and pin connection with the slide 14. The lower end of the lever is pivotally connected with a horizontal bar 53, which carries at its free end an upwardly extending arm 54. The lever 53 is suitably supported by a pivoted arm 55. The arm 54 stands between a pair of bell-crank levers 56, as shown in Figs. 12 and 15. Fig. 12 indicates their normal position. It will be evident that when the bar 53 is moved in one direction it will engage with and turn one of the bell-cranks 56 upon its fulcrum into the position shown in Fig. 15, and that when the bar is moved in the opposite direction it will turn the other bell-crank 56 to a corresponding position. Supported above the bell-cranks 56 is a pawl 57 engaging with the ratchet wheel 44 and provided with restraining springs 58. When the bell-cranks are turned into the position shown in Fig. 15 it allows the pawl to be drawn downward by its springs 58. Arranged at the rear of the bell-cranks 56 is a plate 59 having horizontally slidable support by means of pins 60 supported in the stationary plate 61, said plates being held separated by springs 62. The stationary plate 61 carries projections 63 fitted into openings 64 through the plate 59. Each of the bell-cranks carries upon its inner end a dog 65. The dog 65 of the first bell-crank turned to the position shown in Fig. 15, will catch in one of the openings 64, and the dog of the other bell-crank will interlock with the first mentioned dog as shown in Fig. 16. When both bell-cranks are raised and the dogs interlocked, the bar 53 and its arm 54 cannot be returned to normal position until the arm 54 presses inward the dogs and slidable plate 59, as will be evident by referring to Fig. 17. As the arm 54 presses inward the dogs and plate 59, the projections 63 will strike the dogs 65 and release them, allowing the bell-cranks to drop by gravity to the position shown in Fig. 12. As the bell-cranks drop to the position shown in Fig. 12, the inner ends of their upper arms being carried upward, as indicated in Fig. 12, will shove upward the pawl 57 to actuate the ratchet and through it the tape. This makes the space between the printing operations. The slidable support for the bell-cranks permits of the operation just described.

In Figs. 18 to 21 is shown the mechanism for moving the tape a predetermined distance for a certain travel of the car, say every mile. Upon the car axle is mounted a worm 66, intermeshing with the worm wheel 67 mounted upon the shaft 68. The parts are so constructed that the worm wheel 67 will be turned once during every predetermined distance of travel, as for instance a mile. When traveling in one direction the shaft 68 will be turned by means of the pawl 69 and ratchet 70; and when traveling in the other direction the shaft 68 will be turned in the same direction by means of the gearing 71 interposed between the opposite side of the worm wheel and shaft. The opposite end of the shaft has gear connection 72 with a cam 73. Arranged to ride upon the cam 73 is a slidable spring restrained rod 74 carrying upon its upper end a pawl 75 which engages with the ratchet wheel 44. Once during each revolution of the shaft 68 the cam 73 will actuate the rod 74 to turn the ratchet wheel through the medium of the pawl 75. This gives the tape a predetermined movement. It will therefore be evident that when a passenger steps upon the lower steps, the flight will swing upon the pivots in one direction, and when the passenger steps upon the upper steps the flight will swing upon the pivots in the other direction. This, by means of the mechanism described, reciprocates the slide 14, and in each reciprocation of the slide prints upon the tape the mark either of the type 22 or type 23. If a person enters the car, the type 22 will print first, and if he departs from the car the type 23 will print first, and thus the tape will show whether the passenger has departed or entered, and the number of entrances or departures. Inasmuch as the passenger must step upon both the lower and upper steps to print from both type and thereby make a complete impression, it will be evident that for a passenger to merely step upon the lower steps, will only result in making an imperfect impression, that is, printing from only one type, and such imperfect impressions can, of course, be eliminated from the reckoning when the tape is examined.

As has been explained in detail, separate mechanism is employed for moving the tape between the impressions of the two type; for moving the tape between the completed impressions of the different passengers, and for moving the tape a predetermined amount for each certain distance traveled. In use the tape can be referred to as desired and an accurate reckoning thereby kept of the number of passengers entering into and departing from the cars.

I claim:

1. In combination a flight of movably supported car steps, a slide, recording mechanism supported by said slide, adjacent tape feeding means, means actuated from said steps for reciprocating said slide, means actuated from said slide when moved in either direction for actuating said tape feeding means, and means actuated from said slide upon being moved in both directions to independently actuate said tape feeding means.

2. In combination a flight of pivotally supported car steps, tape feeding means, recording mechanism actuated by the tilting of said steps to make contact with a tape carried by said feeding means, means for actuating the tape feeding means between the impressions of said recording mechanism, a main driving shaft, and means operated by said driving shaft for actuating said tape feeding means upon predetermined rotations of said driving shaft.

3. In combination a flight of pivotally supported steps, tape feeding mechanism, recording mechanism arranged in connection therewith and independently actuated by the opposite tilting movements of said steps, means actuating the tape feeding mechanism upon the independent tilting movements of said steps, and means independently actuating said tape feeding mechanism after said steps have been tilted in both directions.

4. In combination a flight of pivotally supported steps, a slide, recording mechanism arranged in connection with said slide, adjacent tape feeding mechanism, means for actuating said recording mechanism on opposite movements of said slide, means for independently actuating said tape feeding mechanism after said slide has been moved in both directions, and an operative connection between said slide and steps.

5. In combination a flight of pivotally supported steps, a slide, recording mechanism, tape feeding mechanism, means for actuating said tape feeding and recording mechanism in each movement of said slide, means for independently actuating said tape feeding means after said slide has been moved in both directions, and an operative connection between said slide and steps.

6. In combination a flight of movably supported car steps, a slide, printing mechanism arranged in connection with said slide, hammers carried by said slide, adjacent tape feeding mechanism, means for actuating said hammers and tape mechanism in the movement of said slide, an operative connection between said slide and steps, a driving shaft, and means for actuating said tape mechanism from said shaft.

7. In combination a flight of movably supported car steps, a slide, a pair of pivotally supported hammers carried by said slide, printing mechanism arranged in connection with said slide, adjacent tape feeding mechanism, means actuated from said steps for reciprocating said slide, means actuated from said slide when moved in either direction for actuating said recording and tape feeding mechanism, and means actuated from said slide upon being moved in both directions to actuate said tape feeding mechanism.

In testimony whereof I affix my signature in presence of two witnesses.

NICHOLAS J. BARND.

Witnesses:
H. S. JOHNSON,
HATTIE SMITH.